Feb. 20, 1940. L. M. ALEXANDER Re. 21,370
MUSICAL CHIME
Original Filed Oct. 7, 1937
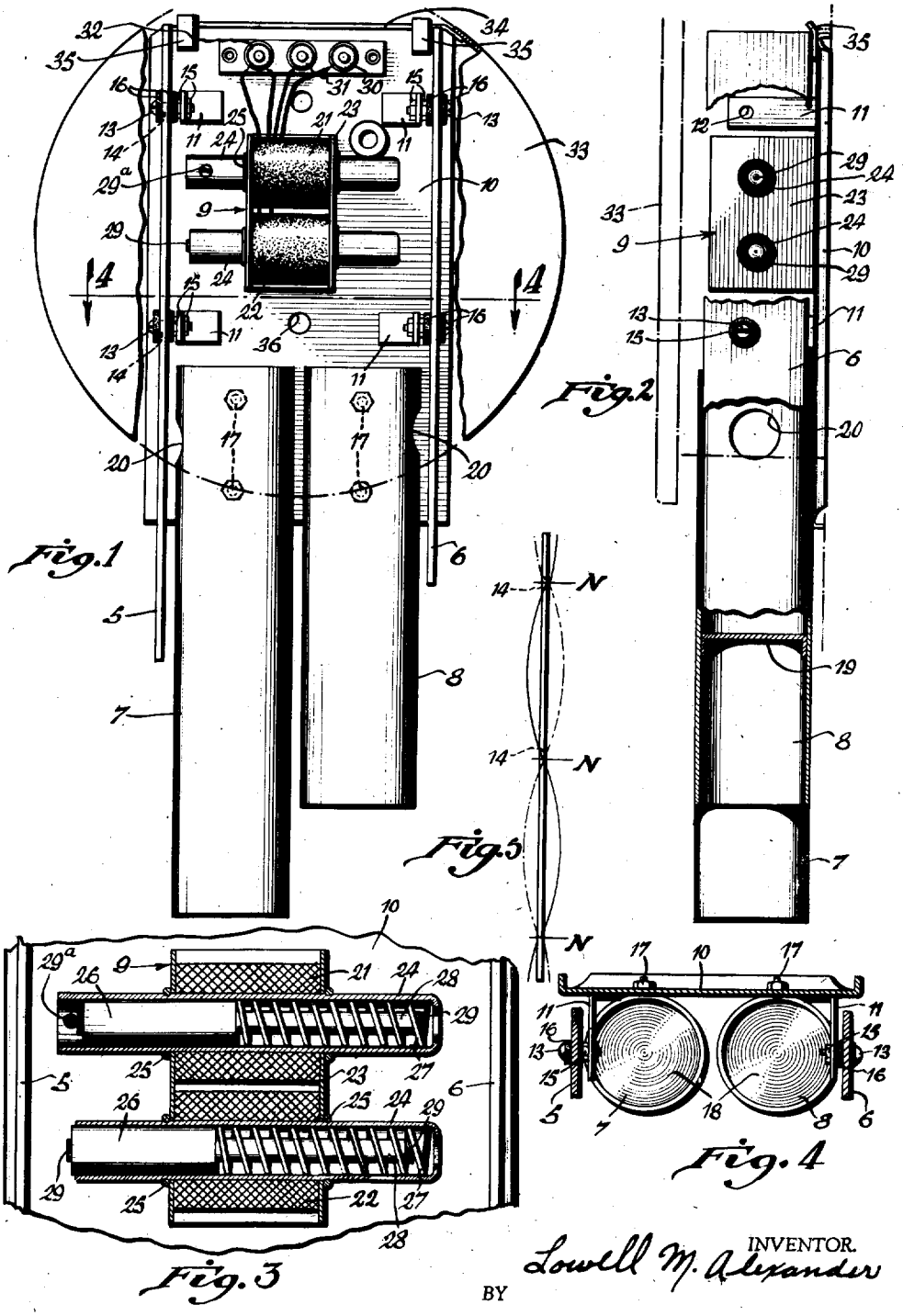
INVENTOR.
Lowell M. Alexander
BY
Wood & Wood ATTORNEYS.

Reissued Feb. 20, 1940 Re. 21,370

UNITED STATES PATENT OFFICE 21,370

MUSICAL CHIME

Lowell M. Alexander, Cincinnati, Ohio, assignor to Nutone Chimes Inc., New York, N. Y., a corporation of New York Original No. 2,133,911, dated October 18, 1938, Serial No. 167,787, October 7, 1937. Application for reissue October 7, 1939, Serial No. 298,477

5 Claims. (Cl. 84—410)

This invention relates to improvements in percussion instruments and signals, and is directed particularly to chimes of musical tone which are adapted for use in homes and offices in place of the conventional bells and buzzers.

The chimes of the invention are comprised generally of a resonance chamber or resonator, which has an aperture for the admission of air, a vibratable bar adjacent the opening in the resonator and adapted to cause resonation of the chamber, and a striker for vibrating the bar.

While this general combination of elements is old in the art, it has always been considered necessary to mount the bar at a point centrally adjacent the opening in the resonator, and likewise to strike the bar centrally to obtain clear and musical tones. Usually the striker has been placed at the middle of the bar on one side and the resonator disposed with its opening central of the bar on the other side, in an arrangement such as that shown in the United States patent to Deagin No. 890,341. The parts, in such an arrangement obviously are spread over a considerable area, and the structure is a cumbersome one, difficult to house, or cover to obtain an instrument of pleasing appearance. This is particularly true when it is desired to use two or more sets of resonators and chime bars respectively of different pitch for producing double tone or chord effects.

In order to improve the design the proposal has been made to position the striker within the resonance chamber for movement through the opening therein toward a bar on the outside, but this structure, although more compact, is also more complex and difficult to manufacture, and its use has not been favored.

These signal instruments to which the invention relates usually are mounted on the walls in the homes or offices. It is very desirable that their appearance be pleasing and attractive. The aesthetic effects which are obtained through a given arrangement of parts and through appropriate designing, have been recognized to be quite as important, so far as usage of the instruments is concerned, as the mechanical structure or combination of the elements.

The object of the present invention has been to provide a chime comprised of a striker, a bar adapted to be vibrated by the striker, and a resonator adapted to be vibrated by the bar, in which these elements are arranged compactly and in such a manner that an instrument pleasing in design and appearance is provided.

A further object of the invention has been to provide an instrument which is simple in structure and economical to manufacture, capable of providing musical tones of fine clarity and quality, and capable of being operated electrically, for signal or door bell use, and also manually, for instance, as a dinner chime.

The present invention is based upon the determination that central mounting of the striker, the bar, and the resonator, one to the other, is not an essential requirement. The invention essentially is characterized by the arrangement in which the parts are compacted into a chime of pleasing appearance. The elements preferably are located so that the bar is struck between supported nodes. Further, in accordance with the invention, a casing or housing is provided, the vibratable bar and resonator are supported within the casing, but extend therebeyond, and electric striker means for the bar is housed within the casing, enabling the bar to be vibrated electrically or mechanically from within the casing, or manually at a point outside the same, while the casing also acts as a head facing for the resonator projecting therebeyond.

A chime bar vibratable through two or more nodes, for example, three nodes or four, is employed in conjunction with a resonator and striker. The bar and resonator are parallel with one another and partially coextensive. The bar extends beyond the resonator so that it may be struck intermediate two adjacent nodes by a striker placed adjacent the end of the resonator, and the opening in the resonator is placed adjacent a coextensive portion of the bar so that the resonator is sounded when the bar is struck.

A preferred embodiment of the invention in which a pair of chimes are used to provide a two-toned chime effect is illustrated in the accompanying drawing. While the invention is disclosed in relation to a double chime instrument the features and advantages of the invention also may be used in the construction of a single chime unit, or one adapted for single, instead of double, enunciator function. However, in the double chime instrument, an important feature of the invention resides in the employment of a pair of resonator tubes depending from the base in parallel relationship with one another, vibratable bars suspended from the base in spaced parallel relationship, for resonating the resonator tubes, and a striker unit mounted on the base intermediate the bars and preferably above the tubes. By this arrangement, a structure which is very compact, and still more important, very pleasing in appearance, is provided.

Figure 1 is a face view of the musical chime embodying two resonators having different pitches, and also embodying electro-magnetic means for vibrating one or both of the bars selectively.

Figure 2 is a side elevation of the chime with several of the parts shown fragmentarily.

Figure 3 is a cross sectional view through the electromagnetic means providing the striking mechanism, and Figure 4 is a cross sectional view taken on the line 4—4 of Figure 1.

Figure 5 diagrammatically illustrates the manner in which a bar of the invention is adapted to vibrate.

The device illustrated in the drawing, comprises a pair of vertically depending bars 5 and 6 and a pair of resonators 7 and 8, one for each bar, mounted side by side adjacent or between the pair of bars. An electrically operated percussion unit 9 is mounted in operating relationship between the bars above the resonators.

A base plate 10 provides a mounting bracket and the bars are attached thereto, each by means of a pair of angular brackets 11—11, welded or otherwise attached to the plate. The projecting ends of the angular brackets respectively are provided with holes 12 to accommodate attachment screws 13.

In the preferred practice of the invention, bars are used which possess the capacity to develop two or more full vibrational anti-nodes instead of the single full anti-node vibrations which have characterized devices of the past. Each full anti-node through which the bar vibrates comprises two nodal points, that is to say, points corresponding to the points N shown in Figure 5. Thus, a bar developing two full anti-nodes will comprise three nodes, and in the practice of the present invention, it is preferred to support the bar at two of these nodes, and to provide a remaining node unsupported or, to support the bar primarily at one node, and position the bar loosely at at least one other nodal point to hold it suitably in the instrument. By such construction, the bars of the invention are comprised of a portion capable of developing a "loop" between supported nodes and another portion capable of developing a "loop" between a supported node and an unsupported node.

Thus, referring to the drawing, the upper holes 14 of the bars, shown in the drawing, are located directly on the upper nodal axes, and the central holes 14 of each bar preferably are so spaced that the tops of the holes are tangent with the center nodal axes.

However, in the present specification and claims, the term anti-node designates a non-nodal portion whether it be a point of maximum vibration intermediate two nodes or whether it be at the end of the bar beyond a node.

The attaching screws 13 transverse the holes 12 of the brackets and each is locked in place by means of a pair of nuts 15—15, one on each side of the bracket. A fibre or rubber sleeve covers the shank of the screw to cushion the bar where it is traversed by the screw. The upper holes 14 are preferably enlarged to clear the sleeves passing therethrough. By virtue of this arrangement the bars essentially are balanced at nodal supports 14 and are free to vibrate and develop anti-nodes on either side of such supports. A pair of sponge rubber washers 16 is provided on the screws, one on each side of each bar. These serve to prevent the bar from coming into contact with the head of the screw or with the bracket. Thus, the bars are securely held in place but also are loosely hung and cushioned so that the impact of the strikers in contacting the bars does not produce a jangle which would result were the bars in contact with the metal parts. The cushioning effect also permits the bars to vibrate for a longer period after having been struck than if they were rigidly mounted.

The resonators 7 and 8 consist of chambers mounted parallel to the bars, each dimensioned to provide an air column adapted to vibrate at the same frequency as the bar. The resonators preferably comprise cylinders depending downwardly from the base plate 10, each being attached thereto by a pair of attaching screws 17, for rigid attachment to the base plate.

Closure members 18 and 19 are inserted in the top and bottom of each cylinder, the lower member being driven inwardly a sufficient distance to produce the proper resonator pitch for its respective bar. The air opening 20 in communication with the interior of each cylinder is located near the upper end and adjacent the bar to which it is attuned. Each bar is in spaced parallel relation with a cylinder, a distance just sufficient to insure ample clearance at all times so as to secure the maximum resonance.

The percussion or striker unit 9 consists of a pair of solenoid coils 21 and 22 mounted in a V-shaped bracket 23 welded or otherwise attached to the base plate 10. Each coil includes a brass sleeve 24 which projects outwardly beyond each end. The sleeves have a pair of spaced peripheral grooves adapted to accommodate retainer rings 25 which contact the opposite sides of the bracket, holding the coils in place in the bracket.

Each of the sleeves houses a striker consisting of an iron solenoid plunger 26 sustained therein. A light compression spring 27 is engaged between the plunger and on inturned lips at one end of the sleeve. These springs hold the plungers outwardly so that normally only a portion of the plungers are within the core of the solenoid coils. Each plunger includes an extended portion 28 of reduced diameter extending substantially the length of the sleeves. The extended portion of the plungers is of nonmagnetic material such as wood so as not to be affected by the magnetic flux of the coils.

The operating ends of the plungers are provided with cushioning pads 29 of leather or other fibrous material. It will be noted that the sleeve of the upper coil 21 has a screw 29a at one end which acts as a stop so that the plunger or striker in this sleeve cannot strike the left hand bar. The sleeve of the lower coil 22 is open at both ends so that the plunger is free to strike both of the bars.

When the upper solenoid coil is energized the plunger is drawn sharply to the right, the inertia carrying it beyond the central position in the coil so as to strike the right hand bar. After striking the bar the plunger centralizes in the coil so as to keep the cushioned striker end out of contact with the bar. When the coil is deenergized the plunger is retracted by the spring against the stop screw. The lower coil operates in this same manner in striking the right hand bar but when the coil is deenergized the spring forces the plunger sharply to the left to strike the left hand bar so as to produce a two tone or chord effect.

By this arrangement the device produces two entirely different signals, each coil being in connection with a separate signal button for independent operation. For example, if the buttons are located at two doors in different parts of the house the signals being readily distinguishable will indicate which door is to be attended.

One end of the windings of the coils 21 and 22 is in electrical connection with the terminal posts 30 and 31 and the opposite ends of each winding are in connection with a common terminal post 32. The post 32 is connected to one line of the feed circuit while the other line is connected with the signal buttons and thence to the terminal posts 30 and 31 to complete the circuit.

A cover or housing 33 is provided on the device for concealing from view the base plate and mechanism mounted thereon. Within this cover the resonators, the bars, and the electro-magnetic means for striking the bars are mounted. Externally of the housing, however, the bars are extended so that they may be struck manually by a conventional resilient chime hammer. By virtue of this arrangement the chimes may be utilized for electrical operation from a remote point or manually to announce meal time and for similar purposes. The cover 33 is attached by means of a cross bar 34 extending crosswise in the upper portion of the cover and attached to the sides. When the cover is in place, the cross bar rests on the upper edge of the base plate and is held against displacement by a pair of lugs 35.

Upon installation the chime signal is fastened to the wall by means of screws through the holes 36 in the base plate. The cover is then placed in position, the cross bar 34 being engaged on the top edge and between the pair of lugs and the wall surface thus concealing the base plate assembly, but exposing to view, the bars and resonators which extend downwardly through an opening in the cover cut out for this purpose.

Having described my invention, I claim:

1. A signal device comprising a base, vibratable bars suspended on one or more of their respective nodal portions on said base in spaced relationship, a striker unit mounted on the base between said bars and including elements for striking the respective bars, said elements arranged to strike the bars at anti-nodal portions, resonator tubes attached to the base and depending therefrom in parallelism with the respective bars, said resonator tubes including openings disposed adjacent to depending anti-nodal portions of the bars.

2. A signal device comprising a base, vibratable bars suspended from said base on one or more of their respective nodal portions, resonator tubes for the respective bars mounted on the base and disposed parallel to the bars and having openings adjacent depending anti-nodal portions, striker elements mounted on the base between the bars at right angles thereto, said elements disposed adjacent anti-nodal portions of the bars, said elements restrained in normal position by means of springs, means for impelling said elements in one direction, one of said elements free to rebound after striking one bar for striking the other bar, and the other element restrained against rebound, whereby it strikes only one bar.

3. In a signaling device comprising a base, vibratable bars suspended on one or more of their nodal portions on said base in spaced relationship, a striker unit mounted on said base between said bars and having an element for striking one of the bars at an anti-nodal portion of it and free to rebound to strike the other bar at an anti-nodal portion of it, resonator tubes attached to the base and depending therefrom in spaced parallel relationship with the respective bars, said resonator tubes including openings disposed adjacent to depending anti-nodal portions of the bars.

4. A signal device comprising a base, a pair of resonator tubes mounted on said base and extending therebeyond and having respective resonator openings, vibratable bars mounted on one or more of their respective nodal portions in spaced parallel relationship to said resonator tubes, with anti-nodal portions of the bars being disposed adjacent to the openings in the tubes, a striker unit mounted on the base between said bars and including elements for striking the respective bars at anti-nodal portions of them.

5. A signal device comprising a base, a pair of resonator tubes mounted on said base and extending therebeyond and having respective resonator openings, vibratable bars mounted on one or more of their respective nodal portions in spaced parallel relationship to said resonator tubes, with anti-nodal portions of the bars being disposed adjacent to the openings in the tubes, striker elements mounted on the base between the bars, one of the elements being free to strike one of the bars at an anti-nodal portion of it, and the other element being free to strike one of the bars at an anti-nodal portion of it, and then rebound to strike an anti-nodal portion of the other bar, and means for impelling the elements in one direction.

LOWELL M. ALEXANDER.